E. P. PORCHER.
ONE MAN FOLDING AUTOMOBILE TOP
APPLICATION FILED MAY 7, 1915.
1,244,366.
Patented Oct. 23, 1917.
2 SHEETS—SHEET 1.
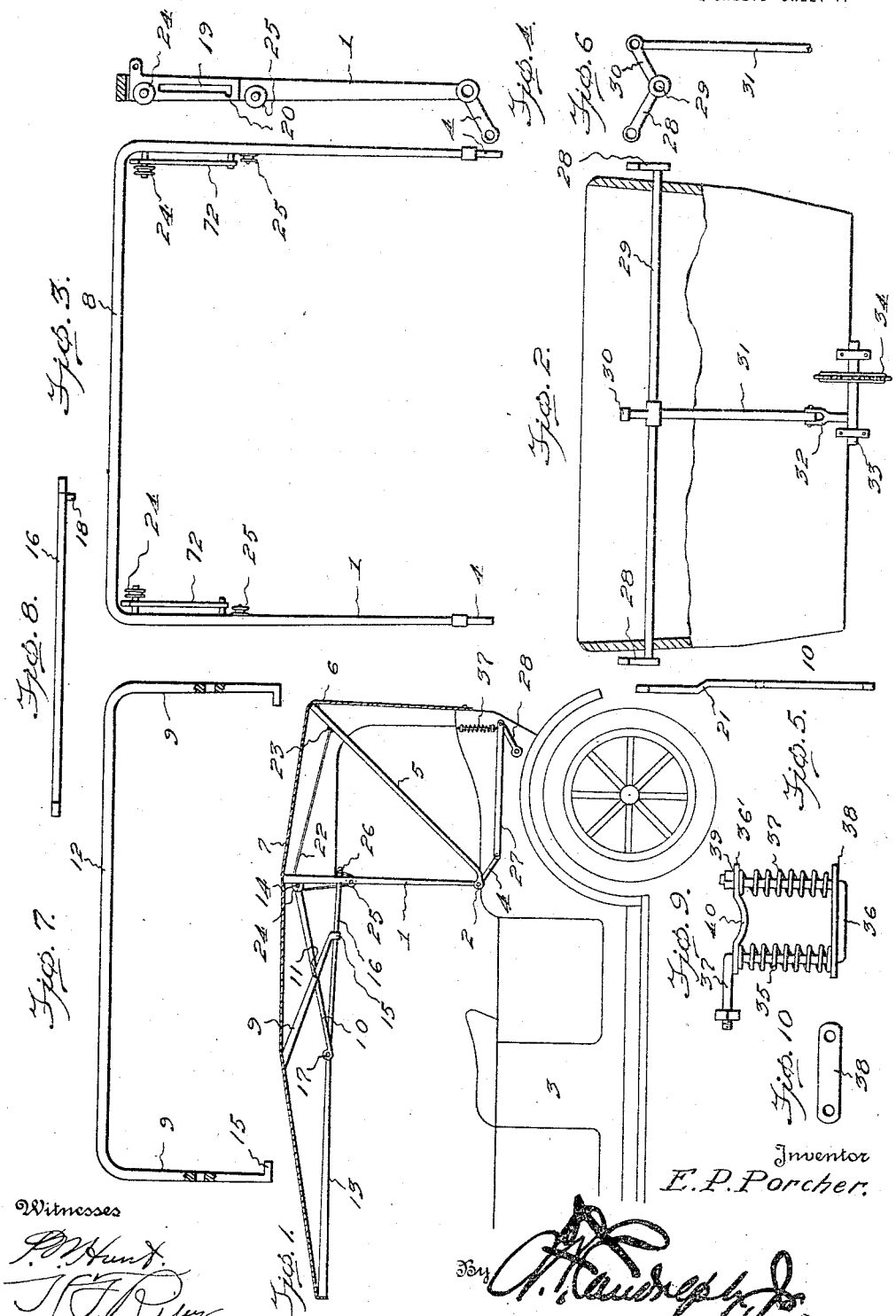
Witnesses
Inventor
E. P. Porcher.

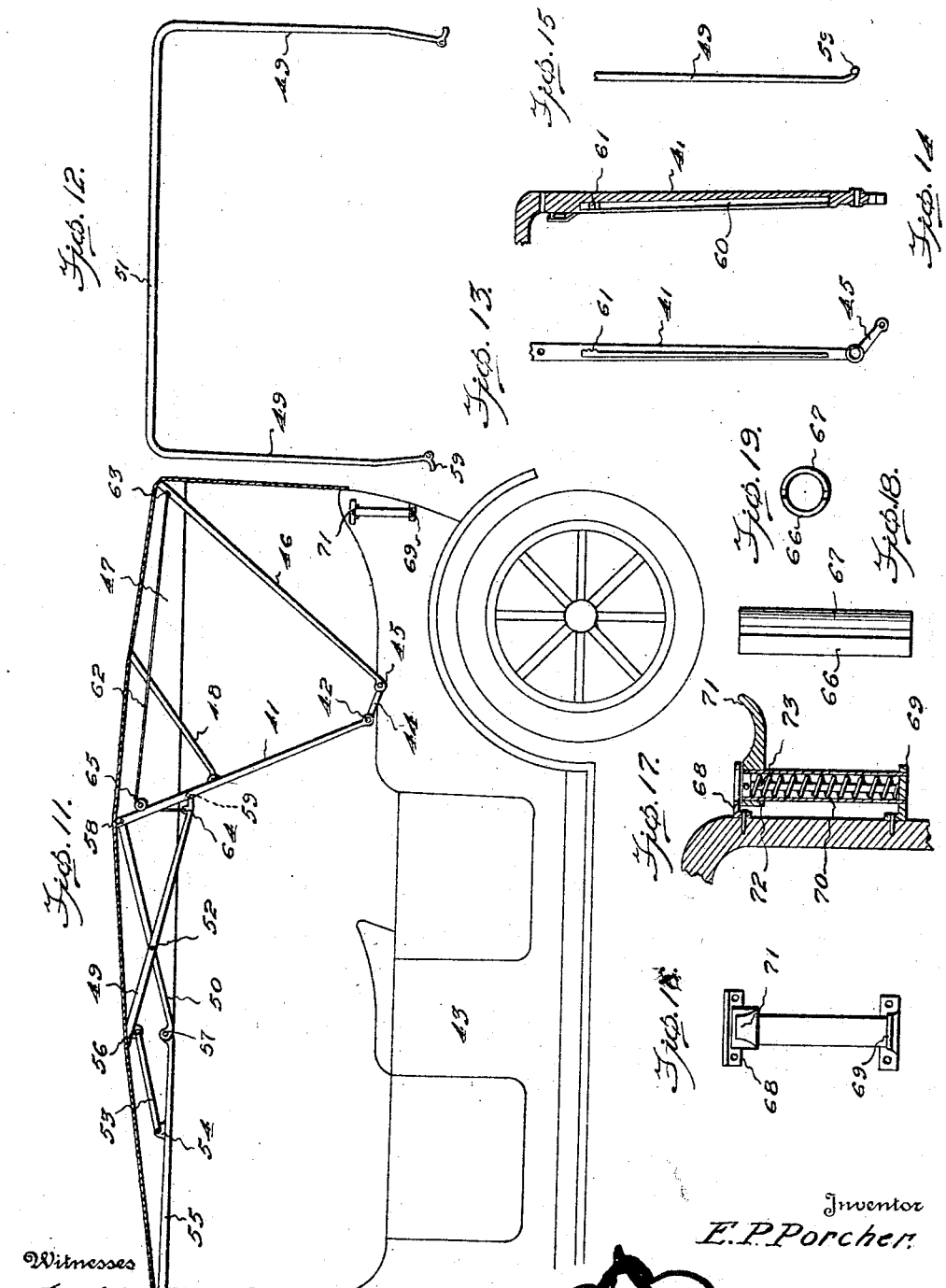

UNITED STATES PATENT OFFICE.

EDWARD P. PORCHER, OF CHARLESTON, SOUTH CAROLINA.

ONE-MAN FOLDING AUTOMOBILE-TOP.

1,244,366.

Specification of Letters Patent.   Patented Oct. 23, 1917.

Application filed May 7, 1915. Serial No. 26,585.

*To all whom it may concern:*

Be it known that I, EDWARD P. PORCHER, a citizen of the United States, residing at Charleston, in the county of Charleston and State of South Carolina, have invented certain new and useful Improvements in One-Man Folding Automobile-Tops; and I do hereby declare the following to be a full, clear, and exact description of the invention, such as will enable others skilled in the art to which it appertains to make and use the same.

The invention relates to improvements in folding automobile tops.

The object of the present invention is to improve the construction of folding automobile tops and to provide a one man folding automobile top of simple and comparatively inexpensive construction adapted to be readily applied to an automobile and capable of being readily folded without necessitating the chauffeur or other person leaving his seat in an automobile.

A further object of the invention is to provide a folding automobile top of this character equipped with opposite cushioning devices arranged to receive the automobile top in the folding operation thereof and adapted to enable the top to be dropped back without liability of injuring the same or the vehicle.

Another object of the invention is to provide a one man folding automobile top adapted in the unfolding operation to stretch the top and lock the parts in their operative positions.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings

Figure 1 is a side elevation of a folding automobile top constructed in accordance with this invention and shown applied to an automobile, Fig. 2 is a rear elevation partly in section illustrating the construction of the mechanism for lowering the automobile top by hand from the chauffeur's seat, Fig. 3 is a detail view of the forward standard and the transverse top connecting bar or rod, Fig. 4 is a side elevation of one of the forward standards the top bar being in section, Fig. 5 is a detail view of one of the bars or members of the lazy-tong frame, Fig. 6 is an end view of the rock shaft, Fig. 7 is a detail view of two of the bars or members of the lazy-tong frames and the transverse connecting bar or rod, Fig. 8 is a plan view of the bracing rod or member of the lazy-tong frames, Fig. 9 is a detail view of one of the side cushions for supporting the automobile top in its folded position, Fig. 10 is a plan view of the plate which forms a seat for the automobile top, Fig. 11 is a side elevation of a folding automobile top shown applied to an automobile and illustrating another form of the invention, Fig. 12 is a detail view of the transverse rod or bar and two of the bars or members of the lazy-tong frames, Fig. 13 is a side view of one of the forward inclined standards, Fig. 14 is a longitudinal sectional view of the same, Fig. 15 is a detail view of one of the bars or members of the lazy-tong frames, Fig. 16 is a side elevation of one of the side cushions, Fig. 17 is a vertical sectional view of the same, Figs. 18 and 19 are detail views illustrating the construction of the guide tube of the side cushion.

Like numerals of reference designate corresponding parts in all the figures of the drawings.

Referring particularly to Figs. 1 to 10 inclusive of the accompanying drawings, 1 designates vertical standards pivoted at 2 to opposite sides of an automobile body 3 at the rear portion thereof and provided with downwardly and rearwardly extending arms 4 arranged at an obtuse angle to the standards 1 preferably at an angle of 120 degrees but the angle may of course be varied as will be readily understood. The pivots 2 at opposite sides of the automobile body also connect rear inclined standards 5 to the automobile body and the said standards 5 are connected at their upper ends by an integral or otherwise formed transverse rod or bar 6. The flexible covering 7 of the top is stretched over the transverse connecting rod or bar and a connecting rod or bar 8 which is formed integral with the vertical standards 1 as clearly shown in Fig. 3 of the drawings, but any other desired construction may of course be employed. The front portion of the covering is supported by side lazy-tong frames each comprising crossed bars or members 9 and 10 pivoted together at 11 at a point intermediate of their ends. The bars or members 9 of the side lazy-tong frames extend downwardly and rearwardly from the covering 7 and they are connected at their front ends by a transverse rod or bar 12 as clearly shown in Fig. 7 of the drawings. The other bars or members 10 of the lazy-tong frames are connected at their front ends to side longitudinal bars 13 and they extend upwardly and rearwardly from the same to the upper portion of the standards 1 and are pivoted to the same at 14. The lower ends of the bars or members 9 are provided with inwardly extending laterally projecting engaging portions 15 which extend beneath combined bracing and operating bars 16 pivoted at their front ends to the longitudinal side bars 13 by suitable pivots 17 and extending longitudinally from the side bars 13 to the standards 1 and provided at their rear ends with pins or projections 18 which slidably engage slots or grooves 19 of the said standards 1.

The slots or grooves 19 which form vertical guides or ways are provided at their lower ends with rear recesses 20 with which the pins or projections 18 interlock when the cover is in its extended position and the automobile top is arranged for use. The tension or strain on the bracing or operating rods or members 16 maintain the laterally projecting pins firmly in engagement with the recesses at the lower ends of the grooves or slots of the vertical standards 1 and when it is desired to fold the top the pins or projections 18 are sprung out of engagement with the said recesses to permit them to ride up the grooves or ways 19. When the bracing or operating bars or members 16 are drawn downwardly in the grooves or ways 19 by the means hereinafter described they engage the laterally projecting terminal portions 15 of the bars or members 9 and spread the lazy-tong frames and push the longitudinal side bars 13 forwardly and stretch the flexible covering 7 of the automobile top. The upwardly and rearwardly inclined bars or members of the lazy-tong frames are provided at their rear portions with bends 21 which laterally offset the rear ends of the bars or members 10 from the vertical plane of the pivots 11 and 17 to provide for the pivoting of the rear ends of the said bars or members 10 to the upper ends of the standards 1 at the curvature thereof as indicated in Fig. 3 of the drawings.

In arranging the folding top for use the bracing or operating bar 16 is drawn downwardly and the lazy-tong frames stretched by means of a flexible connection 22 preferably consisting of a small wire cable located at each side of the automobile. The flexible connection is secured at its rear end 23 to the rear standard 5 and it extends forwardly therefrom over an upper pulley 24 and then downwardly under a lower pulley 25 which is located at the lower end of the guide or way 19 as clearly shown in Fig. 4 of the drawings. The front end of the flexible connection extends upwardly at the rear side of the lower pulley and is secured at 26 to the rear end of the bracing and operating bar or member 16. The flexible connection is pulled upon when the forward standard 1 has moved approximately one-half the distance to its vertical position and the cable operates to draw the bracing rod or operating rod 16 downwardly and causes such rod or member to engage the recess 20 and become interlocked with the standard 1.

In order that this operation may be performed from the chauffeur's seat without leaving the same, the side arms 4 are connected by side rods 27 with side arms 28 of a rock shaft 29 extending across the body of the automobile and mounted in suitable bearings thereof and provided with a central arm 30 which is connected by a vertical rod or bar 31 with an arm 32 of a transverse shaft 33 carrying a gear 34 preferably a sprocket wheel and adapted to be connected by sprocket gearing with a suitable operating device, not shown located adjacent to the chauffeur's seat within easy reach. Any suitable operating means may be employed and various other forms of gearing may be used and if desired a motor may be employed for actuating the shaft 33. The side arms of the rock shaft extend upwardly and rearwardly when the automobile top is in its unfolded or operative position and the side connecting rods 27 enable the rock shaft to simultaneously swing the arm 4 forwardly and rearwardly to lower and raise the automobile top. The automobile top is cushioned at each side of the automobile body by devices each comprising a bracket preferably constructed of a single piece of rod metal and composed of vertical sides 35, a bottom connecting portion 36 and an arm 37 which is suitably secured to the side of the automobile body. The vertical sides 35 which form guides for a plate 36 have disposed on them coiled springs 37 interposed between a bottom plate 38 and an upper slidable plate 39 which is cushioned by the coiled springs 37. The upper plate 39 which is adapted to slide upwardly and downwardly on the vertical guiding sides of the bracket is curved between the same at 40 to receive the rear inclined standards 5. The side cushions yieldably support the folded automobile top as illustrated in dotted lines in Fig. 1 of the drawings and they prevent injury to the top or the automobile body in lowering the top which may be permitted to drop by gravity upon the said cushions.

In Figs. 11 to 19 of the accompanying drawings is illustrated another form of the invention in which the one man folding automobile top comprises forward inclined standards 41, pivoted at 42 at opposite sides of the automobile body 43 and provided with rearwardly extending arms 44 disposed at an acute angle to the standards 41 preferably at an angle of 135 degrees but the angle may be varied. These arms 44 are connected by suitable pivots 45 to the lower ends of inclined rear standards 46 and they serve to permit the top to drop lower in folding than when the rear standards are connected with the standards 41 at the pivots thereof. These arms also permit the top to fold easier and they furthermore serve to stretch the covering 47 in arranging the top for use as the said arms cause the standards 41 and 46 to move in opposite directions.

The standards 41 and 46 at opposite sides of the body are connected at the top by transverse rods or bars preferably formed integral with the standards but they may be made in any other desired manner. The flexible covering 47 is supported between the front and rear standards 41 and 46 by braces 48 provided with a transverse connecting bar or portion and the front portion of the flexible covering is supported and stretched by lazy-tong frames composed of oppositely inclined bars or members 49 and 50. The bars or members 49 which are connected by a transverse rod or bar 51 are pivoted intermediate of their ends at 52 to the bars or members 50 and they extend downwardly and rearwardly from connecting bars 53 pivoted at their front ends at 54 to the longitudinal side bars 55 and similarly connected at their rear ends 56 to the downwardly and rearwardly inclined bars or members 49. The upwardly and rearwardly inclined bars or members 50 are pivoted at their front ends at 57 to the longitudinal side bars 55 and at their rear ends 58 to the upper ends of the inclined standards 41. The rear ends of the bars or members 49 of the lazy-tong frames are provided with laterally projecting studs 59 operating in longitudinal grooves or ways 60 located at the inner faces of the standards 41 and extending downwardly from the upper portions thereof as clearly shown in Fig. 14 of the drawings. The standards 41 are provided at the upper ends of the grooves or ways 60 with a plurality of notches or recesses 61 adapted to be engaged by the laterally projecting studs 59 to interlock the bars or members 50 of the lazy-tong frames with the said standards 41. The notches or recesses 61 are provided to allow for any shrinking or stretching of the flexible cover and they enable the latter to be held tightly in a stretched position by the lazy-tong frames and the front longitudinal bar. The lazy-tong frames are automatically operated in arranging the automobile top for use by means of flexible connections 62 consisting of light wire cables or other suitable devices and secured at their rear ends at 63 to the rear standards 46 and at their front ends 64 to the ends of the bars or members 49. The flexible connections 62 pass over guide pulleys 65 and extend downwardly therefrom to the rear ends of the bars or members 50 and when the standards 41 and 46 are separated the flexible connections are pulled upon and draw the rear ends of the bars or members 49 upwardly and stretch the lazy-tong frames to their extended position. The joints of the lazy-tong frames are preferably provided with projecting ears to enable the parts to hold compactly. In order to enable the automobile top to be dropped without necessitating the chauffeur leaving his seat, cushioning devices are located at opposite sides of the body to receive the rear standards 46. Each cushioning device comprises a vertical guide tube 66 composed of two semi-cylindrical sections spaced apart to form vertical slots 67 and secured together by upper and lower clamps 68 and 69 which are bolted or otherwise fastened to the side of the automobile body. The guide tube which receives a coiled spring 70 has slidably mounted on it an arm 71 provided with a collar or band 72 slidably embracing the vertical tube and provided with a pin 73 which rests upon the upper end of the spring whereby the latter is adapted to cushion the arm 71. The arm 71 has a concaved upper face and is adapted to form a seat for the standard 46 and when the top is dropped the standards engage the cushions at opposite sides of the automobile body and the top is gently lowered to its folded position without injury.

In the form of the invention illustrated in Figs. 1 to 10 inclusive the grooves or ways of the front standards 1 are formed by slots in separate pieces 72 secured to the upper portions of the standards 1 while in the form of the invention illustrated in Figs. 11 to 19 inclusive the grooves or ways of the standards 41 are preferably formed by grooving the standards. Any other suitable form of guide, however, may be employed for this purpose. Also the mechanism for operating the one man folding top shown in Figs. 1 to 10 inclusive may be omitted and the folding top may be operated by hand.

What is claimed is:—

1. In a folding automobile top of the class described the combination of front and rear standards, the front standard being provided with a longitudinal groove or way and having a recess at one end of the same, a lazy-tong frame provided with a member having a projecting portion operating in the said groove or way and adapted to engage the recess, said lazy-tong frame being also provided with a coacting member pivotally connected with the front standard and means carried by the automobile top for automatically moving the said member along the groove or way when the top is raised.

2. In a folding automobile top of the class described the combination of front and rear standards, a lazy-tong frame composed of pivoted bars or members, one of the bars or members being connected at its rear end to the front standard and the other bar or member having a rear engaging portion, an operating bar or member pivoted at its front end to the lazy-tong frame and arranged to slidably engage the rear engaging portions of the said bar and slidably connected with the front standard, and means actuated by the relative movement of the front and rear standards for automatically operating the lazy-tong frame, said means being connected with the said operating bar or member.

3. In a folding automobile top of the class described the combination of a standard, a front longitudinal bar, a lazy-tong frame composed of rearwardly inclined upwardly and downwardly extending bars, the upwardly extending bar being pivoted at its front end to the said longitudinal bar, an operating bar or member pivoted at its front end to the longitudinal bar and engaging the rear end of the downwardly extending bar of the lazy-tong frame and slidably connected at its rear end to the said standard, and means for automatically actuating the operating bar or member to operate the lazy-tong frame.

4. In a folding automobile top of the class described the combination of a standard provided with a longitudinal groove or way, a lazy tong frame comprising crossed members pivoted together intermediate of their ends and extending longitudinally of the top, one of the members being pivoted to the said standard and the other member being provided at its rear end with a projecting engaging portion and a longitudinally disposed operating bar pivoted at its front end to the lazy tong frame and slidably engaging at a point intermediate of its ends the engaging portion of the said member of the lazy tong frame, said operating bar being also slidably connected at its rear end with the groove or way of the standard, and means for actuating the operating bar.

In testimony whereof I affix my signature in presence of two witnesses.

EDWARD P. PORCHER.

Witnesses:
R. V. ROYALL, Jr.,
W. C. DE LOOPER.